US009398155B2

United States Patent
Brimshan et al.

(10) Patent No.: US 9,398,155 B2
(45) Date of Patent: Jul. 19, 2016

(54) ENTERPRISE-WIDE SPLIT FUNCTION IVR CALLBACK SYSTEM

(71) Applicant: Verizon Patent and Licensing Inc., Arlington, VA (US)

(72) Inventors: Michael Brimshan, Old Bridge Township, NJ (US); Thomas Robert Hessel, Copley, OH (US); Jonathan Doucette, Irvine, CA (US); Cuong Do-Vu, Somerset, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/475,761

(22) Filed: Sep. 3, 2014

(65) Prior Publication Data

US 2016/0065739 A1  Mar. 3, 2016

(51) Int. Cl.
*H04M 1/64* (2006.01)
*H04M 11/00* (2006.01)
*H04M 3/523* (2006.01)
*H04M 3/493* (2006.01)

(52) U.S. Cl.
CPC ............ *H04M 3/5231* (2013.01); *H04M 3/493* (2013.01)

(58) Field of Classification Search
CPC .................................................... H04M 3/5231
See application file for complete search history.

(56) References Cited

U.S. PATENT DOCUMENTS

| 5,519,773 | A | * | 5/1996 | Dumas | H04M 3/36 379/210.01 |
| 5,559,878 | A | * | 9/1996 | Keys | H04M 3/48 379/210.01 |
| 6,094,574 | A | * | 7/2000 | Vance | H04M 3/42042 455/415 |
| 6,879,683 | B1 | * | 4/2005 | Fain | H04M 3/523 379/209.01 |
| 8,233,611 | B1 | * | 7/2012 | Zettner | H04M 3/5231 379/210.01 |
| 8,885,812 | B2 | * | 11/2014 | Margulies | 379/265.02 |
| 9,191,508 | B1 | * | 11/2015 | Mekonnen | H04M 3/48 |
| 2001/0041562 | A1 | * | 11/2001 | Elsey | H04M 3/493 455/414.3 |
| 2006/0262922 | A1 | * | 11/2006 | Margulies | G06Q 30/02 379/265.12 |
| 2010/0284522 | A1 | * | 11/2010 | Jaiswal | H04M 3/42195 379/88.04 |

* cited by examiner

*Primary Examiner* — Joseph T Phan (57) ABSTRACT

A system related to connecting customers to agents of a business includes an inbound (INB) interactive voice response (IVR) computer, an outbound (OUTB) IVR, and a computer telephony interface (CTI) computer. The INB IVR computer receives an inbound call from a customer and determines that there is a delay in a call queue of a call center. The OUTB IVR places an agent outbound call (on behalf of the customer) to the INB IVR which is then placed into the queue of the call center in response to the customer selecting a call-back option. The CTI computer then monitors the call center, and sends a notification to the OUTB IVR processor in response to the agent outbound call connecting to the available agent. Responsive to the notification, the OUTB IVR computer places a customer outbound call to the customer to connect the customer to the available agent.

20 Claims, 8 Drawing Sheets

Inbound call-back network topology

ENTERPRISE-WIDE SPLIT FUNCTION IVR CALLBACK SYSTEM

BACKGROUND

Voice portals are used to answer calls and obtain information from callers. For example, businesses often use voice portals that include interactive voice response (IVR) computers to interact with callers and to obtain information from the callers. IVR computers also may be used by the business to make outgoing calls to customers and/or potential customers.

The IVR computer may be combined or associated with an automatic call distributor (ACD) or the like, so that under certain conditions of the IVR processing of a call, the call may be transferred to an available agent (e.g., customer service representative) of the enterprise for further interaction with the customer or prospective customer. When the IVR computer receives an inbound call, for example, the customer may wish to speak with an agent. However, an agent may not be immediately available to speak with the customer. In this scenario, the IVR computer places the customer in a holding queue (i.e., place the customer on hold) until an agent becomes available.

These current IVR solutions may not provide positive customer experience. Specifically, when agents are unavailable as described above, customers are placed in a holding queue and may have to wait for a long time before an agent becomes available. This holding technique wastes the customer's time, and reduces the overall customer experience when dealing with the IVR solution of the business.

BRIEF DESCRIPTION OF THE DRAWINGS

The figures depict one or more implementations in accordance with the present teachings, by way of example only, not by way of limitation. In the figures, like reference numerals refer to the same or similar elements.

DETAILED DESCRIPTION OF EXAMPLES

In the following detailed description, numerous specific details are set forth by way of example in order to provide a thorough understanding of relevant teachings. However, it should be apparent that the present teachings may be practiced without such details. In other instances, well-known methods, procedures, components, and/or circuitry have been described at a relatively high level, without detail, in order to avoid unnecessarily obscuring aspects of the teachings.

A need exists to provide an IVR solution that reduces the time that an end user (e.g., a mobile device user, landline telephone user, etc.) actually waits on a call when attempting to contact an agent of an enterprise (e.g., a business). Providing a proxy IVR application allows the IVR computer to hold the customer's place in the queue while contacting an agent, so that the customer need not stay on the call while in queue. Once an agent becomes available in the call center, then the IVR computer is able to call-back the customer and connect the customer's phone to the available agent with little or no wait time.

Figure 1:
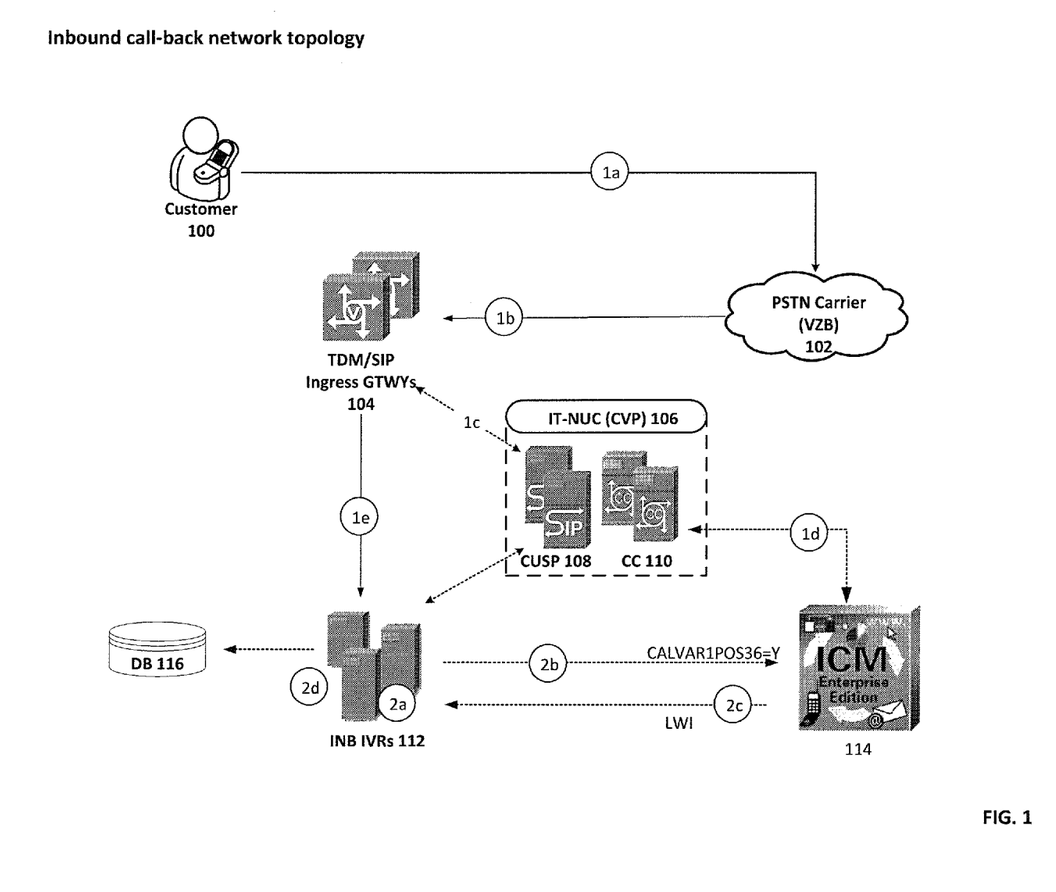
FIG. 1 is a block diagram representing network components for executing an inbound call flow from a customer to the IVR computer.

Shown in FIG. 1 is an example of an inbound call-back network topology, in block diagram form. The illustrated network topology includes various network elements allowing the customer to contact the inbound (INB) IVR computer 112. Specifically, FIG. 1 shows customer 100, who may be utilizing a mobile device or a landline device to connect with the INB IVR computer 112. Callers, in the example, reach the INB IVR computer 112 through the public switched telephone network (PSTN) 102. Landline callers' telephones may connect directly to the PSTN. Although not separately shown, users of mobile devices call in through a mobile communication network offering connectivity to the PSTN 102.

FIG. 1 also shows a time division multiplexing (TDM)/session initiation protocol (SIP) ingress gateway 104 linking the INB IVR computer 112 to the PSTN 102. It should be noted that the signaling (e.g. SIP) between the devices in FIG. 1 is shown by dashed lines. The ingress gateway allows phones or other devices of multiple users (i.e., of multiple customers) to connect to the INB IVR computer 112 utilizing different time slots per customer through PSTN 102 or other networks (not shown). The INB IVR computer 112 includes a number of INB IVR computers/servers 112 that have processors such as a hardware microprocessor (i.e. IVR processor) and are configured to provide various interactive voice response functions. In this first example, the INB IVR computers 112 are configured as inbound IVR computers 112 that provide the interactive voice response to calling customers. The INB IVR computer 112 also utilizes an enterprise database 116, which allows the INB IVR computers 112 to store customer and call information for later retrieval. An intelligent contact manager (ICM) 114 (e.g. an ICM computer having an ICM processor) provides routing between the INB IVR computers 112 and the call control servers 110. The ICM 114 is a computer that performs routing of calls between the INB IVR computer 112 call control servers 110 and automatic call distributers (ACD). The call control servers 110 provide call control and enterprise call queuing for IVR and ACD calls using an IP network of the enterprise. In one example, the ICM 114 may receive a route request from one of the INB IVR computers 112. The ICM takes into account information received from INB IVR 112 to determine the agent skill group to which the call should be routed. The ICM 114 also includes information pertaining to queue wait time. This allows the INB IVR computer 112 to make a decision as to whether call-back features should be offered to the user currently communicating with the INB IVR computer 112.

Other factors for affecting the INB IVR computer 112 decision regarding the call-back feature may include personal history information (e.g. payment history, purchase history, etc.) pertaining to the user calling the INB IVR computer 112, time settings (e.g. minimum or maximum wait times, the time of day/week/year, urgency of the call topic, whether the user is an existing customer or a new customer, etc.). For example, the INB IVR computer 112 may offer the call-back feature to the user is a current customer, while denying the call-back feature to those who are not customers.

During operation, a customer may wish to make a phone call to the enterprise and speak with an agent. This call may be placed by the customer because the customer has technical questions, billing questions and/or other types of questions that they would like answered in vocal conversation with a live agent. If customer 100 is a new customer to the enterprise, for example, the call may relate to a purchase of goods/services or an inquiry about other information regarding the enterprise or its customer-facing activities. In general, the customer places the phone call so that they can talk to the agent and obtain more information regarding a product/service that they already own or a new purchase of a product/service from the enterprise.

In either case, customer 100 dials the enterprise on a communication device, and the communication device connects to the INB IVR computer 112 of the enterprise through PSTN 102 and gateway 104. For example, if the customer 100 is a customer of a telephone service provider, customer 100 may dial a toll-free number. Customer 100 may be seeking technical advice for a cellular phone (i.e., a Smartphone) that the telephone service provider manages, has sold to customer 100 and/or has manufactured.

Rather than route the call directly to an agent, the network and systems typically route the inbound call first to an INB IVR computer 112 platform designated and/or configured as one of the INB IVR computer 112. The particular INB IVR computer 112 receives and answers the call; and upon connecting to the call, that INB IVR computer 112 typically sends voice prompts to ask the customer 100 to make certain selections, for example, to determine details about the customer's query (e.g. account balance, data/minutes usage, store locator, make payment request, etc.). The customer 100 may make selections in response to the voice prompts by speaking into the receiver of the communication device (e.g. selecting menu items by speaking them). The customer 100 may also make selections in response to the voice prompts by pressing buttons on the communication device (e.g. selecting menu items by pressing numbers associated with the items).

INB IVR computer 112 may include business rules of the enterprise that determine the particular voice prompts and order thereof that are offered to the customer, in order to determine an appropriate agent to service the customer's needs. For example, the business rules may be set by the enterprise based on the services and/or products offered by the enterprise. The business rules may also be set based on the identity of the customer communicating with the INB IVR computer 112, e.g. based on an identification of the caller's communication device, e.g., landline or mobile device.

In a more specific example, once the INB IVR computer 112 in FIG. 1 receives the call from customer 100, customer 100 is prompted with the various INB IVR computer selections. In this example, the INB IVR computer 112 may prompt the user that if the customer needs help with technical issues for a product and/or service (supplied and/or managed by the enterprise) that they own and/or have subscribed to (e.g. cellphone (device/service), television (device/service), computer (device/software) etc.) to press 1. Customer 100 presses 1 and, in response, the INB IVR computer 112 may ask further questions to further narrow down a topic that customer 100 wishes to talk about. This narrowing down of the topic is typically performed in accordance with the business rules described above that are preprogrammed into the INB IVR computers of the system and managed by the enterprise.

Once the INB IVR computer 112 determines that customer 100 requires an agent, for example, to help with technical difficulties with their product and/or service, then the INB IVR computer 112 uses ICM 114 to determine the agent skill group and the call center to which the caller is to be transferred.

In another embodiment, if there is a long delay time determined by the ICM 114, then the ICM will return a long wait indicator to the INB IVR 112. This long wait indicator indicates that an estimated wait time before an agent will become available is long (e.g. 5 min, 10 min, 15 min, etc.). Upon receiving the long wait indicator, the INB IVR 112 may then automatically offer the call-back feature to the customer.

In general, if the wait time is determined to be too long, the INB IVR computer 112 offers the customer 100 an option to be called back once an agent is available or at a later point in time. If the customer 100 selects this option in response to the offer message, then the call from the customer 100 is disconnected from the INB IVR computer 112 but scheduled to be called back at a later point in time when an agent is available. The INB IVR computer 112 may also announce the wait time to the customer 100. The customer 100 may then determine based on this wait time if they would like to stay on the phone or receive a call-back. The INB IVR computer 112 may also allow the user to select a maximum wait time preference that they are willing to wait on the phone. In future calls from the same user, the INB IVR computer 112 uses this preference information to automatically offer the call-back feature when the determined wait time is above this maximum.

The INB IVR computer 112 may also take into account the time (local to the customer 100) when the customer 100 is called back. For example, if it is determined that the call-back will not occur until late at night (e.g. 11:00 pm), then the INB IVR computer 112 may offer a call-back to the customer during normal business hours of the following day. Preset rules set by the operator of the INB IVR computer and/or user preferences stored in the INB IVR computer may be used to determine when (i.e. what time of day/week) the callback to the customer is appropriate (e.g. customer preference may indicate that they do not want callbacks after 11:00 pm). These customer preferences may be collected during the phone call to the INB IVR computer or based on previous IVR computer phone calls. Thus, even though the agent may be available late at night, the system holds the queue line based on the user's preferences or requested callback time window until the following day when the customer wants to, or is more comfortable to receive the return phone call.

Figure 2:
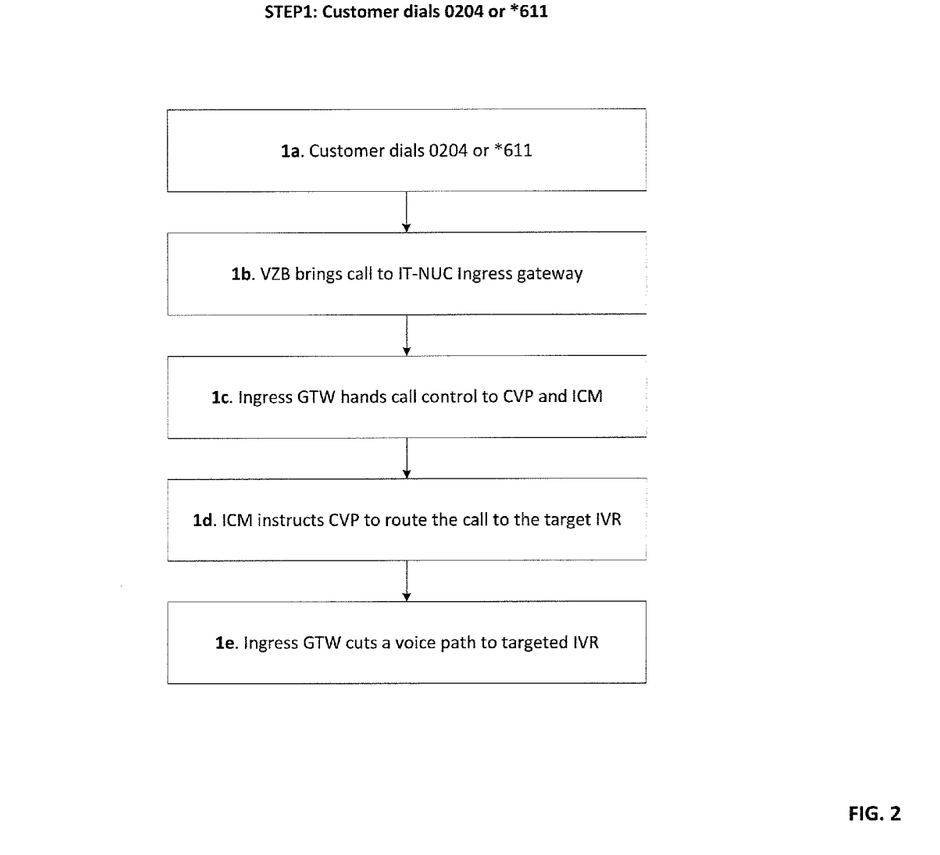
FIG. 2 is a flow chart of call processing in which the customer makes a call from her phone to connect to the IVR computer in the inbound call.
Figure 3:
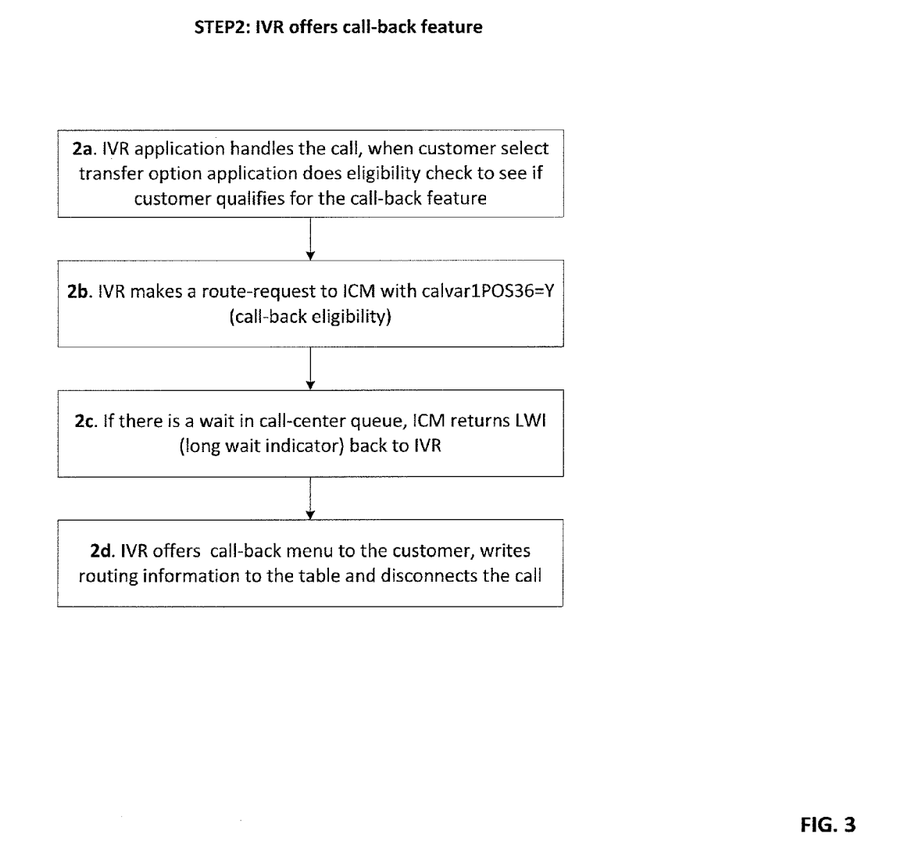
FIG. 3 is a flow chart of call processing in which the IVR computer offers a callback feature to the customer.

The various steps shown in FIG. 1 are described in detail in the flow charts of FIGS. 2 and 3. In step 1, the customer communication device connects to the INB IVR computer 112. Specifically, in step 1a, customer 100 may dial a particular phone number associated with the INB IVR computer 112. The phone call connects through a PSTN carrier network 102. In step 1b, the PSTN carrier network 102 connects the communication device of customer 100 with the ingress gateway 104 that supports the INB IVR computer 112. In step 1c, ingress gateway 104 hands control of the phone call to the CVP, which includes SIP proxy servers 108, call control (CC) servers 110 and ICM 114. In step 1d, ICM 114 instructs the CVP to route the customer's call to the targeted IVR computer. The targeted IVR computer may be an INB IVR computer 112 that is associated with the particular phone number that was dialed by the customer. For example, the targeted INB IVR computer 112 may be an computer owned by the business that provides the customer with a service (e.g. telephone service provider). In step 1e, the ingress gateway 104, upon receiving instructions from the ICM and CVP, creates a voice path to the targeted INB IVR computer 112.

In step 2, the INB IVR computer 112, once connected to the call from the customer 100, provides various voice prompt options for customer 100 to select from. These prompts are typically based on business rules of the enterprise that owns and/or operates the INB IVR computer 112. These voice prompts may allow the customer to select a particular topic that is most relevant to their phone call (e.g. phone service billing, technical questions, etc.). In general, these voice prompts based on the business rules allow the INB IVR computer 112 to determine with more specificity, the topic that the customer 100 is calling about, thereby allowing the INB IVR computer 112 to make a more intelligent decision when routing the customer's call to a particular agent in the call center. For example, if the customer is calling about technical support, then the voice prompts will attempt to route the customer to an agent that is trained to provide technical support. Likewise, billing inquiries by the customer are routed to billing agents. The business rules essentially determine the routing of the call to the appropriate agent.

When appropriate, the INB IVR computer 112 uses a similar functionality of a prompt and customer response detection to offer and activate the call-back functionality. In step 2a, the INB IVR computer application handles the call from customer 100 and check to see if the customer qualifies for the call-back feature. For example, call-back features may be offered to each person that calls the INB IVR computer 112. However, the call-back feature may only be offered to current customers of the business enterprise. Therefore, some persons may qualify for the call-back feature, whereas others may not. Qualification for call-back may also be based on the processing availability of the INB IVR computer 112. For example, the INB IVR computer 112 may have capacity to hold a place in the queue for the customer. In this scenario, the customer qualifies for call-back. However, the INB IVR computer 112 may not have capacity to hold the queue for the customer (i.e. the call volume at the INB IVR computer 112 is too high). In this scenario, the customer may not qualify for call-back. Some of the criteria used to determine customer eligibility for the call-back feature include call-back system capacity, dialed phone number, type of customer (e.g. business, government, private etc.), among others. In step 2b, the INB IVR computer 112 makes a route request to the ICM 114 and attempt to connect the inbound call from customer 100 to an appropriate agent (i.e. an agent that is trained to deal with the customer's selected topic). However, in step 2c the ICM 114 returns a call wait indicator (e.g. long wait indicator) if there is a long wait in the call center queue. This call wait indicator is returned from ICM 114 to the INB IVR computer 112.

In one example, the call wait indicator may be the estimated amount of time before the agent is available, or may be an interpretation of the amount of time such as long wait, medium wait, short wait, etc. For example, three thresholds may be set to determine if the wait is short (e.g. 5 min), medium (e.g. 20 min) or long (e.g. 60 min). These thresholds may be set by the operator of the INB IVR computer (e.g. the business enterprise). Once INB IVR computer 112 receives the call wait indicator, the INB IVR computer 112 offers a call-back feature to customer 100 where it will indicate the estimated wait time in the queue, for example, by sending a voice message over the call for the customer to hear, or by sending a message (e.g. text message), or some other visual indicator that can be seen on the customer's personal computer or smartphone. If customer 100 accepts the call-back feature (e.g. by pressing a button on the phone when the feature is offered by the INB IVR computer 112), then the INB IVR computer 112 writes routing information (e.g. customer information such as a phone number for the device the customer used for the inbound call) into database 116 and disconnect the call with customer 100. This routing information is later used to call-back the customer when an agent becomes available. Prior to disconnecting the customer's inbound call, however, the INB IVR computer 112 notifies the customer 100 (e.g. using a voice prompt) that he will be contacted at a future point in time when an agent becomes available. This future point in time may include an estimate of when an agent becomes available. This estimate may be based on the current and/or past turnaround times of the queue (e.g. how long it takes for the average agent to complete a phone call with a customer). In other examples, the customer may also be prompted with time windows that they would like to receive the call-back. This allows the customer to have more control over when they receive a call-back. The INB IVR computer 112 could offer a call-back option as soon as an agent becomes available, or the INB IVR computer 112 could ask the user to specify a time of day (e.g. between 3 pm and 4 pm) when they would like to receive the call-back. In either case, the customer receives an option to receive the call-back at a later point in time once an agent is available. If the customer selects a certain time of day, this information is also stored with the other customer information such as telephone number, identification, topic of call, name of preferred technician the users wishes to receive the call-back from, etc.

In addition to the call-back feature, if the user selects a particular time period (e.g., the next morning) for the call-back, the system is able to send an SMS message (i.e. a text message) to the phone number associated with the user to remind the user about the call-back. This text message may be sent a predetermined amount of time (e.g. 5 min) before the scheduled call-back. Alternatively, the system can send an invitation message to the user. If the user accepts the invitation, the call-back time is added to the user's online calendar, thereby providing advanced notification for the call-back. This text message or invitation may be sent by a text message server (not shown) in response to an instruction received by the outbound (OUTB) IVR computer shown in FIG. 4.

FIG. 1 shows the basic network topology for an inbound call from customer 100 to INB IVR computer 112. After INB IVR computer 112 takes the customer information, stores it in database 116 and disconnects inbound call of the customer 100, then OUTB IVR computer 417 makes an outbound call to the call center (not shown in FIG. 1) via INB IVR computer 112 (i.e. OUTB IVR calls INB IVR to place call with call center) on behalf of the customer. The details of this outbound call and the call-back feature to customer 100 are shown in the block diagram of FIG. 4.

Figure 4:
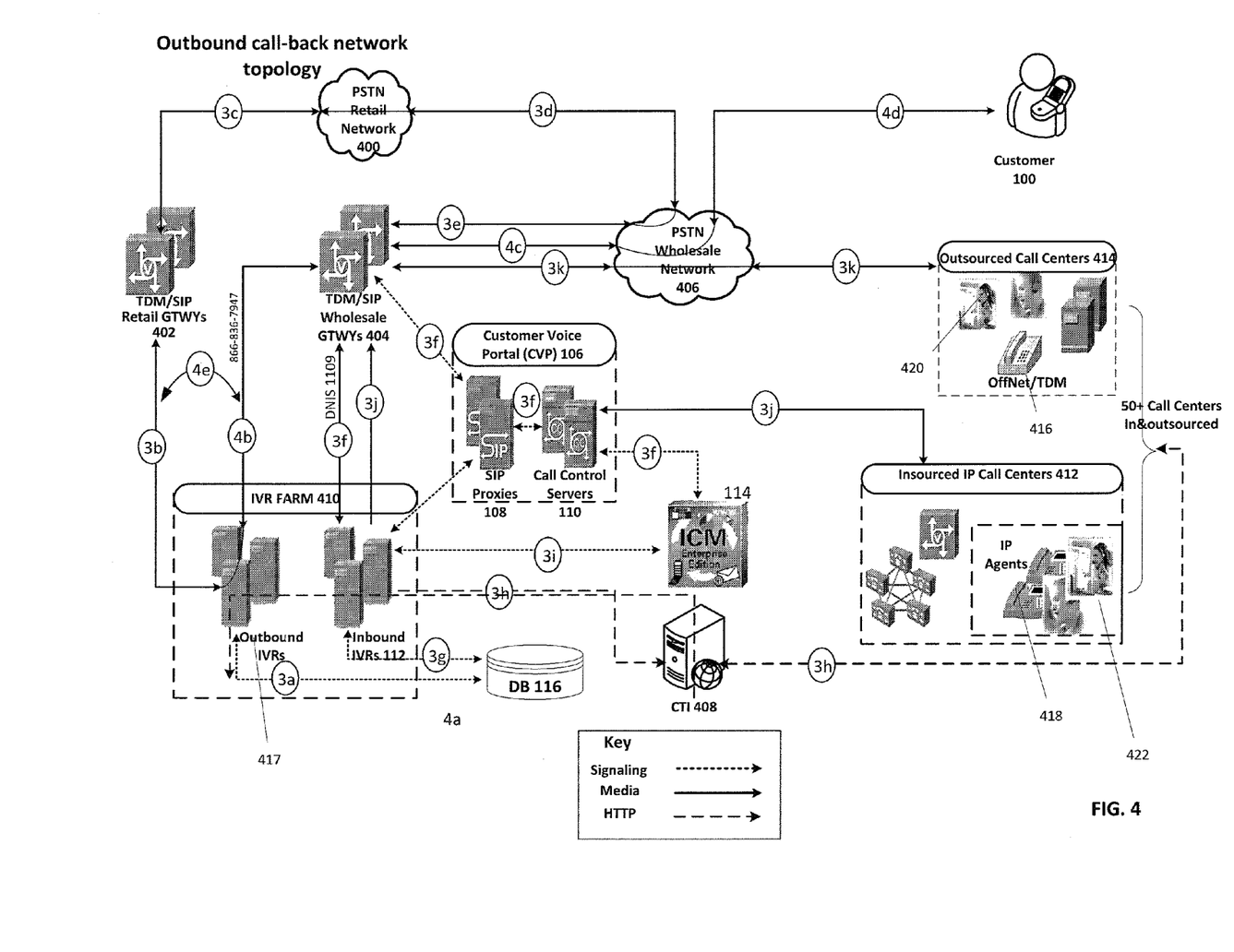
FIG. 4 is a block diagram representing network components for executing an outbound call from the IVR computer to the call center, and then executing an outbound call-back from the IVR to the customer.

FIG. 4 is a block diagram of an outbound call-back network topology where the OUTB IVR computer 417 makes a call to the call center via INB IVR computer 112 on behalf of the customer, holds the customer's place in line in the call center and then calls back customer 100 when an agent becomes available. In general, FIG. 4 shows somewhat similar elements to FIG. 1. Specifically, FIG. 4 shows customer 100, PSTN 406, TDM/SIP gateways 402 and 404 which are ingress gateways for the retail network 400 and wholesale network 406, respectively, INB IVR computers 112, OUTB IVR computers 417, SIP proxies 108, call control servers 110, ICM 114. FIG. 4 also includes outsourced call centers 414 (including agents 420 and agent terminals 416) and insourced call centers 412 (including agents 422 and agent terminals 418). The outsourced call centers 414 may be call centers and agents that are not owned or operated by the enterprise. In contrast, insourced call centers 412 may actually be operated by the enterprise for which they serve. Finally, FIG. 4 also includes a computer telephony interface (CTI) computer 408 (e.g., a CTI computer having a CTI processor), which acts as a monitoring device in order to monitor both outsourced call centers 414 and insourced call centers 412 on behalf of the INB IVR computer 112. It is noted that the INB IVR computers 112, OUTB IVR computers 417, CTI computer 408, and all the devices in FIG. 4 may be implemented as a computer and/or server that includes a hardware processor such as a microprocessor, and other hardware elements shown in FIG. 8.

In general, process flow in the outbound call-back network topology of FIG. 4 is performed in two phases. In the first phase, once customer 100 is disconnected, after selecting the call-back feature offered by the INB IVR computer 112, the OUTB IVR 417 calls the INB IVR computer 112 which then searches the database and utilizes the customer's information (stored by the INB IVR) to place a call into the queue (i.e. agent outbound call) of one of call centers 414 and 412 on behalf of customer 100. Essentially, the OUTB IVR computer 417 in IVR farm 410 acts as a proxy caller for customer 100. The INB IVR computers 112 in IVR Farm 410 then register with CTI computer 408 which monitors the call placed by the OUTB IVR computer 417 to the call center.

In the second phase, the CTI computer 408 monitors the call placed from the OUTB IVR computer 417 to the call center and determines when an agent becomes available. Alternatively, if the user specified a call-back window, then the CTI will monitor the call placed from the OUTB IVR computer during this window. In either case, in this phase, the CTI computer 408 listens for a call event (e.g. when an available agent connects to the call, when an agent terminates a previous call, etc.) from the call center, and determines when the agent phone has connected to the phone call placed by the OUTB IVR computer 417. Once the CTI computer 408 determines that the agent phone has been connected, the CTI computer 408 notifies the OUTB IVR computer 417. Once the OUTB IVR computer 417 is notified that the agent has been connected to the call, then the OUTB IVR computer 417 calls back customer 100 (i.e. make a customer outbound call) and conferences customer 100 with the agent from the call center who is already connected. This essentially provides minimal or no wait time for customer 100 once they get the call-back from the IVR computer 417.

Figure 5:
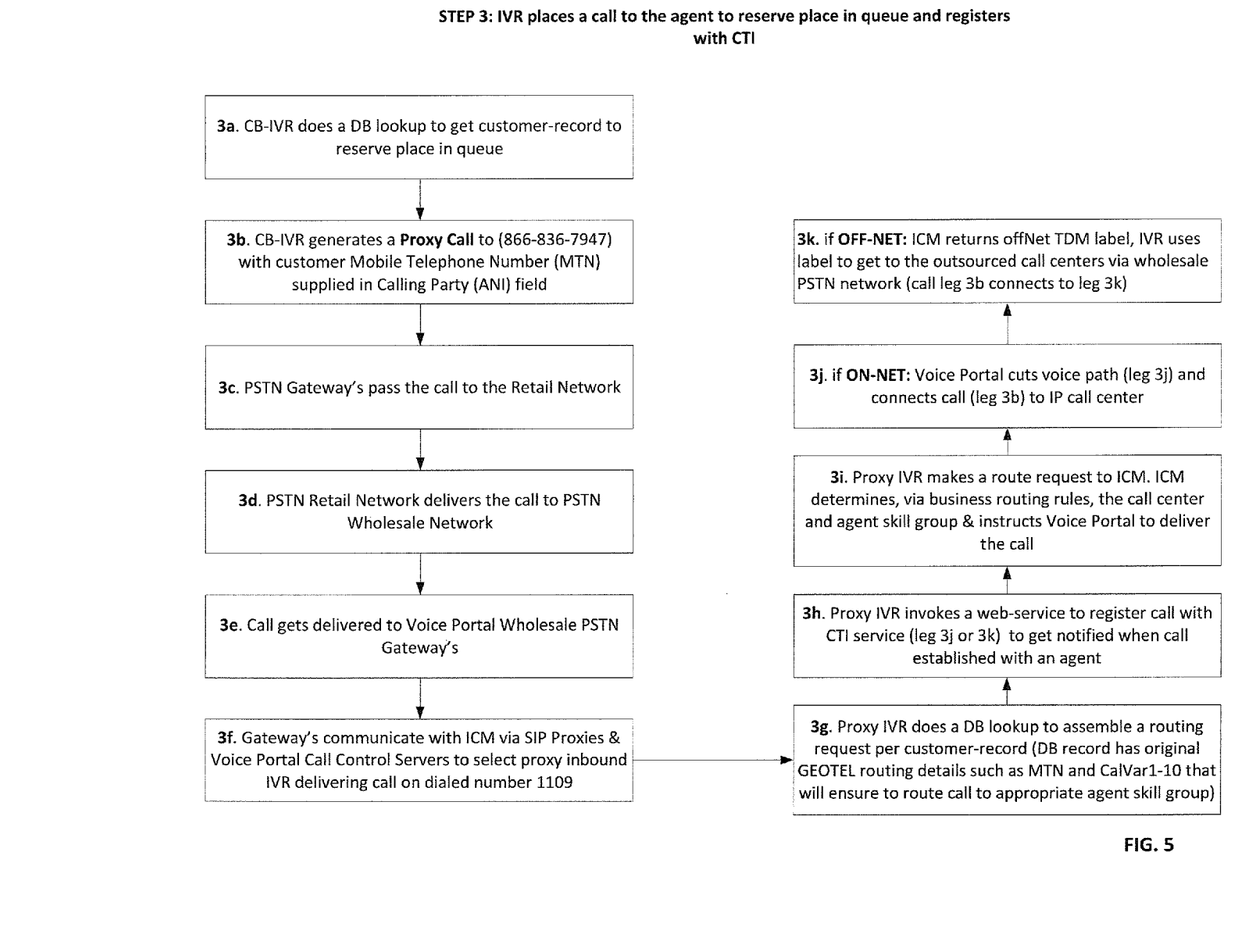
FIG. 5 is a flow chart showing steps where the IVR computer places a call to the agent in order to reserve a spot in the queue for the customer, while registering with a CTI computer.
Figure 6:
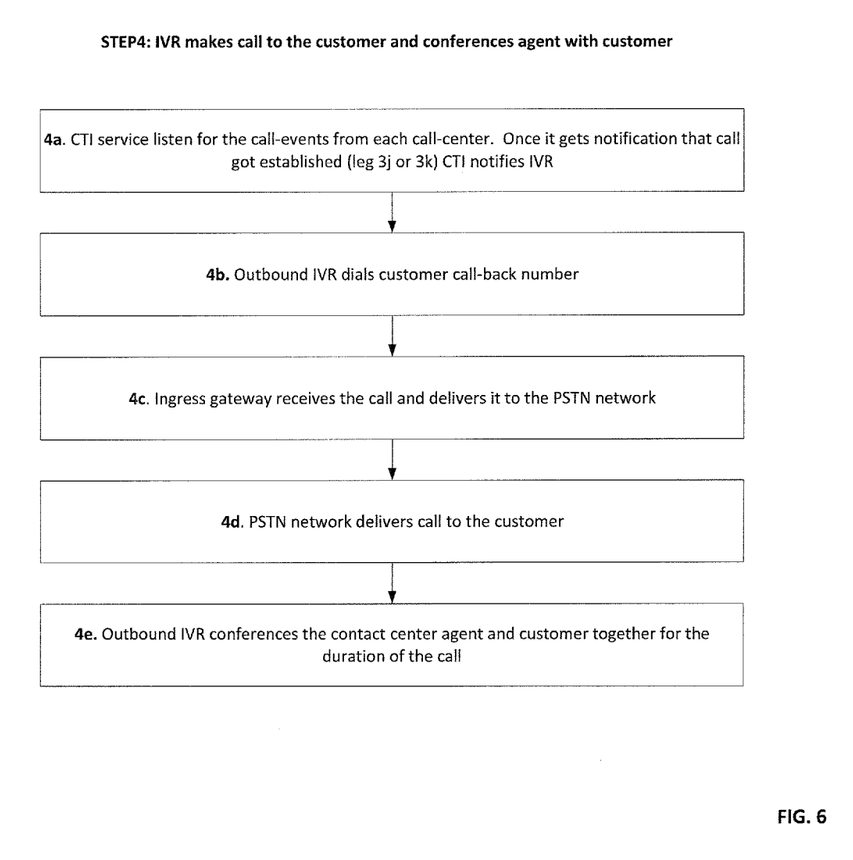
FIG. 6 is a flow chart showing steps where the IVR computer places an outbound call to the customer and conferences the agent with the customer.

Details of the outbound call-back network topology for reserving the spot in the queue on behalf of customer 100, and then calling back customer 100 once the agent is connected to the phone call are described in FIGS. 5 and 6. Specifically, in step 3a, the OUTB IVR computer 417 performs a look-up in database 116 to retrieve the customer record that was stored by the INB IVR computer 112 during the initial inbound call. This record may include customer information such as phone number (e.g. the phone number that the user called from or a preferred phone number that was indicated by the user) and reason for calling (e.g. spoken or entered by the user during the phone call) the INB IVR computer 112. In step 3b, the OUTB IVR computer 417 then generates a call to retail gateway 402 using the customer's local telephone number supplied as the calling party. This call is essentially a proxy call on behalf of customer 100 (i.e. the OUTB IVR computer 417 is calling on behalf of customer 100). In step 3c, the retail gateway 402 passes the call to retail network 400. In step 3d, retail network 400 delivers the call to the PSTN wholesale network 406. In step 3e, PSTN wholesale network 406 delivers the call to the PSTN wholesale gateway 404. In step 3f, wholesale gateway 404 communicates with ICM 114 via SIP proxies and call control servers 110 to select a particular INB IVR computer 112. In step 3g, the INB IVR computer 112 performs a database look-up to assemble a routing request for the customer's needs (i.e., utilizing the customer information to properly route the call to the appropriate agent skill group).

In step 3h, inbound INB IVR computer 112 registers with CTI computer 408 for the CTI monitoring services. In general, the INB IVR 112 invokes a web-service where it passes a unique identifier of the outbound call placed by OUTB IVR 417 to the CTI. The CTI then stores this identifier. Once the outbound call is established between OUTB IVR 417 and the call center, call events are then broadcasted to the CTI. When a call event (including an identifier) is received, the CTI determines if the identifier matches the unique identifier received from the INB IVR 112. If a match occurs, then the CTI notifies the OUTB IVR 417 that a call event has occurred. INB IVR computer 112 may be able to perform this registration utilizing a web based service that is provided by CTI computer 408. This essentially allows CTI computer 408 to monitor the call placed by the OUTB IVR computers 417 and notify the OUTB IVR computers 417 when the call is connected with an agent. After the call has been registered with CTI computer 408, then in step 3i the INB IVR computer 112, acting as a proxy for customer 100, routes a request to ICM 114. Based on business routing rules, ICM 114 determines an appropriate call center and agent for delivering the phone call. Depending on whether the INB IVR computer 112 is utilizing insourced call centers (i.e. call centers owned and/or operated by the business enterprise), or outsourced call centers 414 (i.e. call centers owned and/or operated by a third party), different voice paths are generated. Specifically, in step 3j if insourced call centers 412 are being utilized, then the call control servers 110 cut a direct path to insourced call centers 412. However, if outsourced call centers 414 are being utilized, then in step 3k the ICM returns a label to customer voice portal 106 which instructs the wholesale gateway 104 to connect the voice path through the wholesale network 406 to outsourced call centers 414. In general, phone calls are delivered to the insourced call centers 412 over an enterprise IP network where the CVP 106 maintains call control. Alternatively, phone calls are delivered to the outsourced call centers 414 using a PSTN where the CVP releases the call control to the PSTN.

Once the INB IVR computer 112 is registered with the CTI computer, and places a call on behalf of customer 100 to a particular call center, the CTI computer 408 monitors the call center to determine when an agent phone has connected to the call. The details of this monitoring are described in FIG. 6. Specifically, in step 4a the CTI computer 408 listens for call events from multiple call centers with multiple agents, by receiving a broadcast of the call event from the call center that is transmitted when the agent connects to the phone call. Once CTI computer 408 gets notification that a call from the OUTB computer 417 has been established with a particular agent, then the CTI computer 408 notifies the OUTB IVR computer 417 of this connection. This notification tells the OUTB IVR computer 417 that the agent phone has already been connected to the phone call, and that they are able to call-back customer 100 with no wait time. Thus, in step 4b the outbound IVR computer 417 dials the customer call-back number. The wholesale gateway 404 receives this OUTB IVR computer call and deliver it to the PSTN wholesale network 406 in step 4c. In step 4d the PSTN wholesale network 406 delivers the call to customer 100. If customer 100 answers the phone call and agrees to speak with the agent (e.g. is prompted by the OUTB IVR computer to confirm the connection to the agent), then in step 4e the outbound OUTB IVR computer 417 will conference the agent who is already established on the phone call with the customer.

It should be noted that different occurrences in the call processing of the call to the call center may be detected by the CTI computer 408 as the call event and be processed somewhat different ways to result in different timing of the notification from the CTI computer 408 to the OUTB IVR computer 417. In one example, the call event may be broadcast when the call is established with the agent. In another example, the call event may be broadcast when the agent becomes available (i.e., when the agent hangs up with a previous customer). In another example, the notification sent from CTI computer 408 to the OUTB IVR computer 417 may be performed immediately upon detecting the particular type of call event, or may be delayed based on call center rules or agent preferences. In a specific example providing notification delay, the delay between the call event and sending notification to the OUTB IVR computer 417 may include enough time for the agent to review the customer's record prior to actually being connected to customer 100. In general, the CTI will send the notification to the OUTB IVR 417 when the CTI determines that the agent is actually connected to the call. This prevents the customer from waiting for the agent (i.e. the agent is connected before the customer is connected to the call).

In any event, however, the customer initially calls the INB IVR computer 112, the INB IVR computer 112 provides a call-back option to the customer if the wait in the queue is too long and then the OUTB IVR computer 417 acts as a proxy and places a call to the call center on behalf of the customer. Upon detecting that the agent has connected to a proxy phone call (i.e. after receiving the notification from the CTI computer 408), then the OUTB IVR computer 417 places the outbound call-back to customer 100, thereby allowing customer 100 to immediately connect to an agent that is already connected on the phone call thereby eliminating any waiting time experienced by customer 100.

Figure 7:
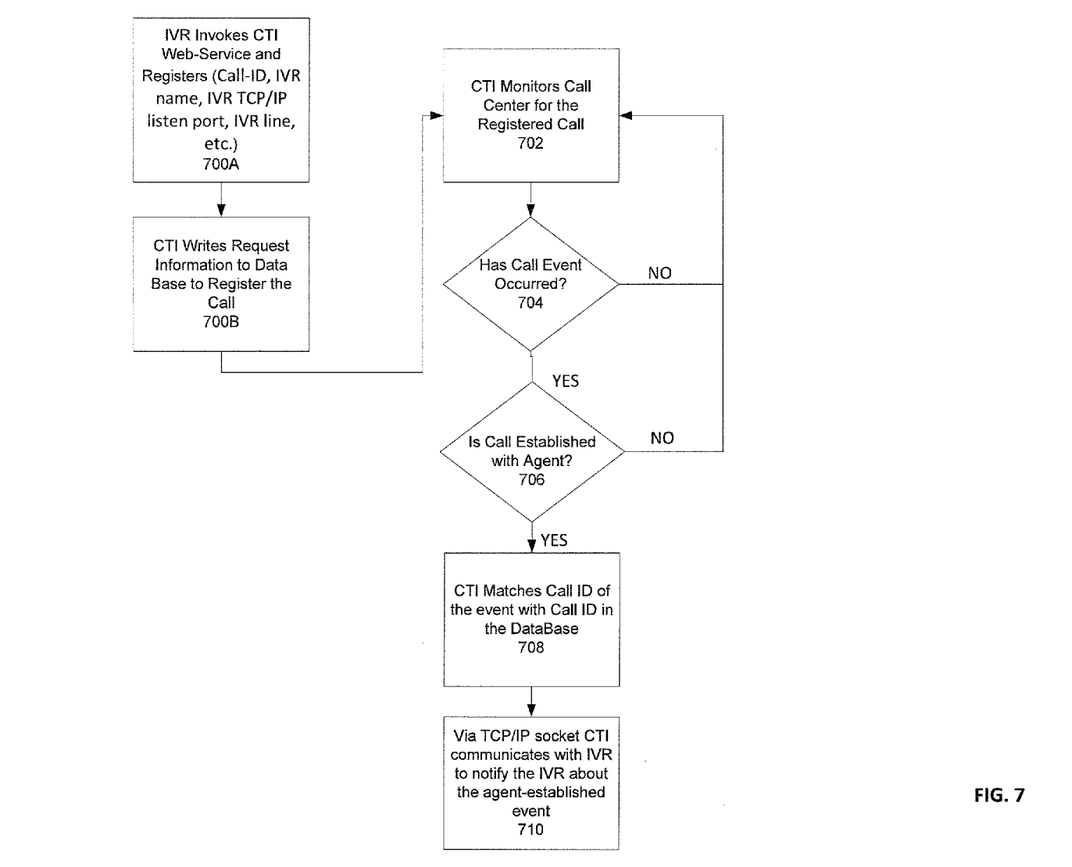
FIG. 7 shows a flowchart of the operations of the CTI computer in FIG. 4.

FIG. 7 is a flowchart showing the overall operation of the CTI computer 408 in FIG. 4. Steps 700A and 700B show the registration with the CTI, while steps 702-708 show the monitoring being performed by the CTI. In step 700A, the CTI computer 408 receives the registration of the customer call from the INB IVR computer 112. This registration may include the identification of the call and the call center to which the call has been placed. For example, the INB IVR computer 112 may invoke the CTI web-service and register Call-ID, IVR name, IVR TCP/IP listen port, IVR line, etc. In step 700B the CTI stores the information received from the INB IVR computer 112 into a registration database. This completes the registration process.

In step 702, the CTI computer 408, uses the registration information to monitor the customer call in the call center queue (i.e. a call made by OUTB IVR 417 on behalf of the customer). In step 704, the CTI computer 408 determines if a call event has occurred or not. If a call event has not been received, then the CTI continues to monitor the call. If a call event has been received, then in step 706, the CTI determines if an agent has been connected to the call If the agent has connected to the call, then the CTI computer 408, in step 708, matches the call ID of the event with the call ID stored in the registration database. Upon determining a match, the CTI computer, in step 710, then sends a notification to the OUTB IVR computer 417. This notification lets the OUTB IVR computer 417 know that the agent has been connected to the phone call, and that the customer should be called back.

Figure 8:
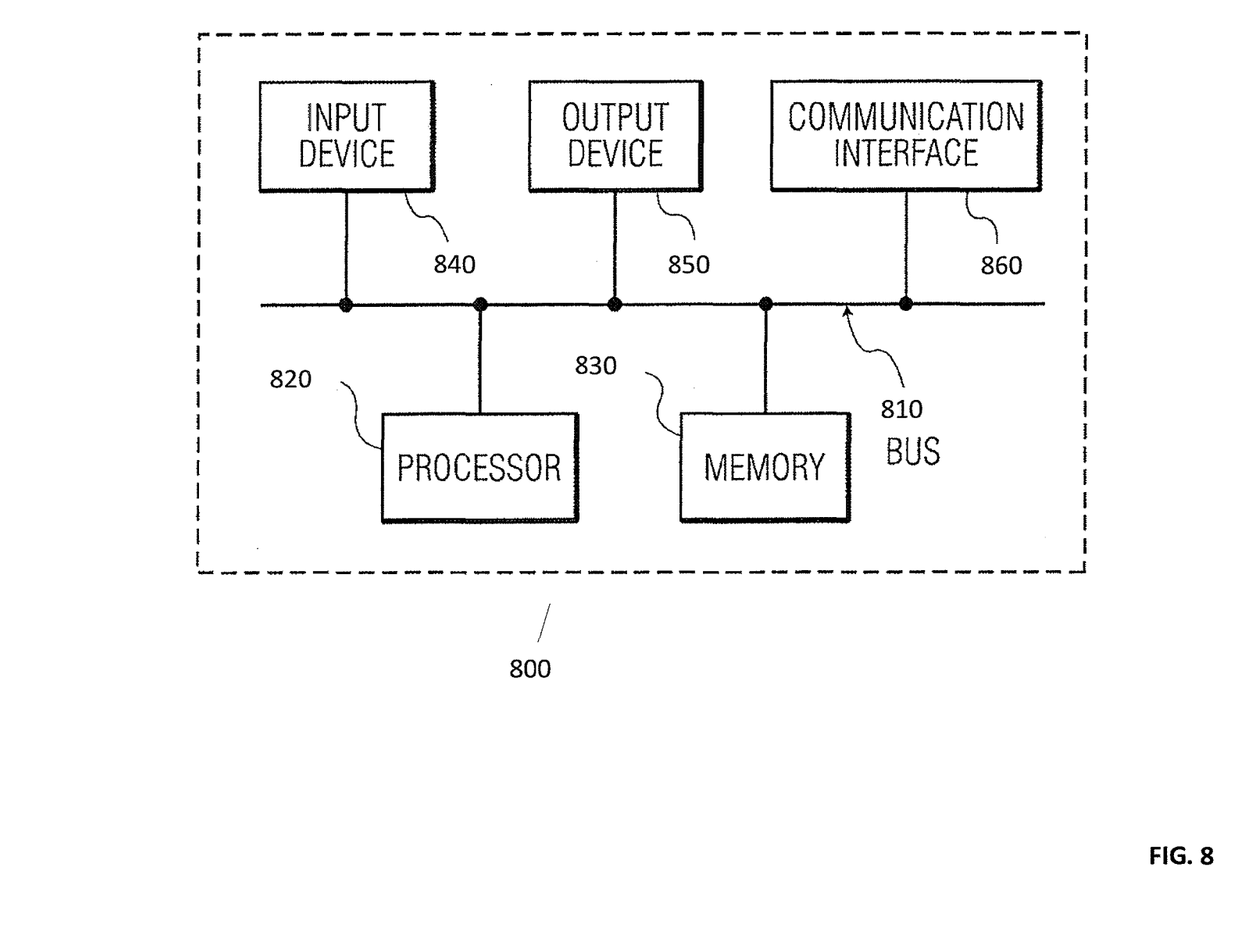
FIG. 8 shows a block diagram of a network device that may be used as any one of the devices shown in FIGS. 1 and 4.

FIG. 8 is a diagram of example components of a device 800 that may operate within the environment shown in FIGS. 1 and 4. Specifically, device 800 may correspond to any of the various network devices shown in FIGS. 1 and 4 (e.g. IVR computer, CTI computer, User Phone, Gateways, etc.). Each of these devices may include one or more of the components shown in FIG. 8.

As shown in FIG. 8, device 800 may include bus 810, processor 820 (e.g. microprocessor, FPGA, ASIC, etc.), memory 830 (e.g. RAM, ROM, etc.), input device 840 (e.g. keyboard, etc.), output device 850 (e.g. monitor, etc.), and communication interface 860 (e.g. wired, wireless, etc.). However, in other implementations, device 800 may include fewer components, additional components, different components, or differently arranged components than those illustrated in FIG. 8.

Bus 810 may include one or more component subsystems and/or communication paths to enable communications among the components of device 800. Processor 820 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 820 may control the overall operation, or a portion thereof, of device 800, based on, for example, an operating system and/or various applications. Processor 820 may access instructions from memory 830, from other components of device 300, or from a source external to device 800 (e.g., a network or another device). In one example, these instructions may control the IVR computer 112 to prompt the customer for input, register with the CTI, and provide call-back to the customer. In another example, these instructions may control the CTI computer 408 to monitor the call center for the call event, and notify the IVR computer 112 when the agent has connected to the monitored phone call.

Memory 830 may include memory and/or secondary storage. For example, memory 830 may include random access memory (RAM), dynamic RAM (DRAM), read-only memory (ROM), programmable ROM (PROM), flash memory, or some other type of memory. Memory 830 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices. The programming instructions of the IVR computers, CTI computer, etc. may be stored in these memory elements for the respective devices.

In one example, when device 800 is a phone or computer of the customer attempting to connect with the IVR computer 112, input device 840 may include one or more components that permit the user to input information into device 800. For example, input device 840 may include a keypad, a button, a switch, a knob, fingerprint recognition logic, retinal scan logic, a web cam, voice recognition logic, a touchpad, an input port, a microphone, a display, or some other type of input component. Output device 850 may include one or more components that permit device 800 to output information to a user. For example, output device 850 may include a display, light-emitting diodes (LEDs), an output port, a speaker, or some other type of output component.

Communication interface 860 may include one or more components that permit device 800 to communicate with other devices or networks. For example, communication interface 860 may include some type of wireless or wired interface. Communication interface 830 may also include an antenna (or a set of antennas) that permit wireless communication, such as the transmission and reception of radio frequency (RF) and/or optical signals. The communications interface 830 may additionally or alternatively support a wired connection, for example, an Ethernet connection to a wired portion of the network. The communication interface 860 may include multiple digital transceivers, for communicating with multiple access networks. These interfaces may allow the CTI computer and IVR computers to communicate with each other, and with other network devices such as the gateways, control servers, call center, etc. Essentially, each network device in FIGS. 1 and 4 may use an interface to send and receive the various messages shown.

As described herein, device 800 may perform certain operations in response to processor 820 executing software instructions contained in a computer-readable medium, such as memory 830. The software instructions may be read into memory 830 from another computer-readable medium or from another device via communication interface 860. The software instructions contained in memory 830 may cause processor 820 to perform one or more processes described herein. Alternatively, hardwired circuitry may be used in place of, or in combination with, software instructions to implement processes described herein. Thus, implementations described herein are not limited to any specific combination of hardware circuitry and software.

For example, the processor may instruct the IVR computer 112 to prompt the customer with voice prompts, place a proxy call to the call center on behalf of the customer, register with the CTI computer and call-back the customer when receiving the notification from the CTI computer 408. In another example, the processor may instruct the CTI computer to monitor the call from the IVR computer 112 in the queue, and notify the IVR computer 112 when an agent has connected to the call in the queue.

In one example, the IVR computers may include an IVR processor, IVR communication interface and IVR memory having programming instructions stored thereon. Likewise, the CTI may include a CTI processor, CTI communication interface and CTI memory having programming instructions stored thereon. During operation, the IVR processor may perform the various operations described above with respect to receiving calls from customers, placing calls to customers, registering with the CTI computer, etc. based on the programming instructions stored in the IVR memory. These various operations are generally performed with the other network devices via the IVR communication interface. Likewise, during operation, the CTI processor may perform the various operations described above with respect to receiving registration from the IVR computer 112, monitoring the IVR call in the call center queue, providing notification to the IVR computer 112, etc. based on the programming instructions stored in the CTI memory. These various operations are generally performed with the other network devices via the CTI communication interface.

The various functions of the overall IVR based system shown in the figures (e.g. IVR, decision engine, desktop integration, data source teams, command center, IVR utilities, ICM, ACD, etc.) and described above can be implemented in digital electronic circuitry, in computer software, firmware or hardware (e.g. microprocessor, ASIC, FPGA, RAM, ROM, etc.). The techniques can be implemented using one or more computer program products. Programmable processors and computers can be included in or packaged as mobile devices. The processes and logic flows can be performed by one or more programmable processors and by one or more programmable logic circuits. General and special purpose computing devices and storage devices can be interconnected through communication networks.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the IVR-related techniques outlined in this disclosure may be embodied in programming, for example, for execution by processors of an IVR computer 112 or a CTI computer. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into another computer platform. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the IVR-related techniques discussed in this disclosure. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer," "server," "processor," and "memory" all refer to electronic or other technological devices. These terms exclude people or groups of people. Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims.

What is claimed is:

1. A system, comprising:
an inbound interactive voice response (IVR) computer including:
a communication interface,
a memory, and
a processor to:
receive an inbound call from a customer through the IVR communication interface,
determine that there is a delay in a call queue of a call center after receiving the inbound call from the customer,
offer a call-back feature to the customer based on determining that there is the delay in the call queue of the call center, and
register, after a selection of the call-back feature, an agent outbound call with a computer telephony interface (CTI) computer through the communication interface using a web-based service by providing information pertaining to the agent outbound call to the CTI computer,
the information pertaining to the agent outbound call including at least one of an outbound IVR name, a TCP-IP port number, an outbound IVR port number, or an ID of the agent outbound call,
the call center being monitored by the CTI computer to determine when the agent outbound call connects to an available agent,
a notification being sent by the CTI computer to an outbound IVR computer when the agent outbound call connects to the available agent,
a customer outbound call being placed to the customer by the outbound IVR computer based on the notification to connect a communication device of the customer to the available agent.

2. The system of claim 1, further comprising the CTI computer including:
a CTI communication interface, and
a CTI processor to:
monitor, through the CTI communication interface, at least one insourced call center owned by an enterprise of the inbound IVR computer, and
monitor, through the CTI communication interface, at least one outsourced call center owned by a third party separate from the enterprise of the inbound IVR computer.

3. The system of claim 1, wherein, when offering the call-back feature, the processor is to:
determine that the delay in the call queue satisfies a threshold amount of time, and
offer, through the communication interface, the call-back feature to the customer based on determining that the delay satisfies the threshold amount of time.

4. The system of claim 1, wherein the processor is further to:
route the agent outbound call to a specific agent group within the call center based on business rules and based on the selection of the call-back feature.

5. The system of claim 1, wherein the processor is further to:
perform a database lookup to retrieve information relating to the customer, and
route, based on the information relating to the customer, the agent outbound call to an appropriate agent after the selection of the call-back feature.

6. The system of claim 1, further comprising the CTI computer including:
a CTI communication interface, and
a CTI processor to:
send, through the CTI communication interface, the notification to the outbound IVR computer a predetermined time after the agent outbound call connects to an available agent.

7. A method for connecting customers to agents, comprising:
receiving, by an inbound interactive voice response (IVR) computer, an inbound call from a customer through a network,
determining, by the inbound IVR computer, that there is a delay in a call queue of a call center,
registering, by the inbound IVR computer and using a web-based service, an agent outbound call with a computer telephony interface (CTI) computer after receiving the inbound call and after determining that there is the delay in the call queue of the call center,
registering the agent outbound call including providing information pertaining to the agent outbound call to the CTI computer,
the information pertaining to the agent outbound call including at least one of an outbound IVR name, a TCP-IP port number, an outbound IVR port number, or an ID of the agent outbound call,
the call center being monitored by the CTI computer to determine when the agent outbound call connects to an available agent,
a notification being sent by the CTI computer to an outbound IVR computer when the agent outbound call connects to the available agent, and
a customer outbound call being placed by the outbound IVR computer based on the notification to connect the customer to the available agent.

8. The method of claim 7, further including:
monitoring, by the CTI computer, at least one insourced call center owned by an enterprise of the outbound IVR computer and the inbound IVR computer, and
monitoring, by the CTI computer, at least one outsourced call center owned by a third party separate from the enterprise of the outbound IVR computer and the inbound IVR computer.

9. The method of claim 7, further including:
determining that the delay satisfies a threshold, and
offering, by the inbound IVR computer, a call-back option to the customer based on determining that the delay satisfies the threshold.

10. The method of claim 7, further including:
identifying a selection of a call-back option, and
routing, by the inbound IVR computer, the agent outbound call to a specific agent group within the call center based on business rules and the selection of the call-back option offered by the INB IVR computer.

11. The method of claim 7, further including:
performing a database lookup to retrieve information relating to the customer, and
route, based on the information relating to the customer, the agent outbound call to an appropriate agent.

12. The method of claim 7, further including:
sending, by the CTI computer, the notification to the outbound IVR computer a predetermined time after the agent outbound call connects to an available agent,
the predetermined time allowing the available agent to review customer information prior to being connected to the customer through the outbound IVR computer.

13. A computer, comprising:
a communications interface configured to communicate via a network;
a memory; and
a processor to:
provide a web-based service to an inbound interactive voice response (IVR) computer;
receive, via the web-based service, registration information from the inbound IVR computer after the inbound IVR computer receives an inbound call from a customer,
the registration information identifying an agent outbound call placed by an outbound IVR computer to the inbound IVR computer into a call queue of a call center, and
the registration information including at least one of an outbound IVR name, a TCP-IP port number, an outbound IVR port number, or an ID of the agent outbound call,
monitor the call center via the network to determine when the agent outbound call connects to an available agent, and
send a notification to the outbound IVR computer via the communications interface when the agent outbound call has connected to the available agent,
the notification instructing the outbound IVR computer to place a customer outbound call to the customer to connect the customer to the available agent.

14. The computer of claim 13, wherein the processor is further to:
monitor at least one insourced call center of an owner of the inbound IVR computer, and
monitor at least one outsourced call center owned by a third party separate from the owner of the inbound IVR computer in response to a customer agreeing to be called-back by the outbound IVR computer when the available agent of the call center becomes available.

15. The computer of claim 13, wherein, when sending the notification, the processor is to:
send the notification to the outbound IVR computer a predetermined time after the agent outbound call connects to the available agent,
the predetermined time being specified by the call center or the available agent.

16. The computer of claim 13, wherein the processor is further to:
receive registration information from a plurality of inbound IVR computers that are different from the inbound IVR computer,
monitor a plurality of call centers that are different from the call center, and
send notifications to a plurality of outbound IVR computers that are different from the outbound IVR computer based on monitoring the plurality of call centers.

17. The computer of claim 13, wherein, when monitoring the call center, the processor is to:
- receive an identifier from the call center,
- determine that the identifier matches a unique identifier received from the inbound IVR computer, and
- determine that the agent outbound call has connected to the available agent based on determining that the identifier matches the unique identifier.

18. The computer of claim 13, wherein the notification indicates that the available agent is able to call back the customer with no wait time.

19. The computer of claim 13, wherein, when monitoring the call center, the processor is to:
- monitor the call center based on the registration information.

20. The computer of claim 13, wherein, when receiving the registration information, the processor is to:
- receive the registration information after the inbound call determines that there is a delay in the call queue of the call center and after the customer selects a call-back option.

* * * * *